United States Patent Office

2,839,566
Patented June 17, 1958

2,839,566

PREPARATION OF HETEROCYCLIC ORGANOBORON COMPOUNDS

Robert L. Letsinger, Wilmette, Ill., and Ivan H. Skoog, St. Paul, Minn., assignors to Callery Chemical Company, Pittsburgh, Pa., a corporation of Pennsylvania No Drawing. Application June 27, 1955
Serial No. 518,405

6 Claims. (Cl. 260—462)

This invention relates to the preparation of new heterocyclic organoboron compounds and in particular it relates to the synthesis of 5-hydroxy-10,11-dihydrodibenzo-[b,f]-borepine and derivatives thereof.

There has been considerable interest shown in recent years in the preparation of new aromatic and aliphatic organoboron compounds for use as fuel additives and as intermediates in the preparation of other boron containing compounds with interest and unusual properties. Many boranes have been made containing alkyl or aryl groups but the isolation in the pure state of a heterocyclic compound which has only carbon and boron in the ring has never been reported.

It is an object of this invention to provide a method for the preparation of new and useful heterocyclic organoboron compounds. Another object is to provide a method for preparing 5-hydroxy-10,11-dihydrodibenzo-[b,f]-borepine and derivatives thereof. Additional objects will become apparent throughout the specification and appended claims.

These new organoboron compounds and methods for synthesizing them will be more fully described hereinafter and the novelty thereof will be particularly pointed out and distinctly claimed.

This invention is based upon the discovery that a stable heterocyclic compound containing only carbon and boron in the ring can be isolated in the pure state by the following series of reactions:

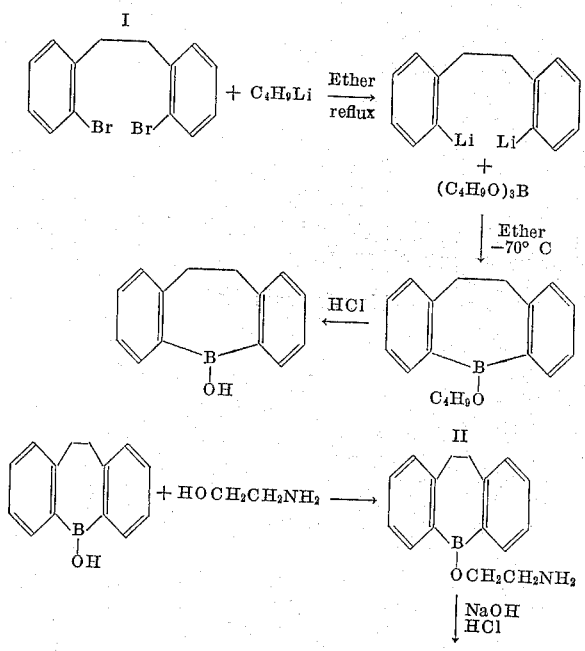

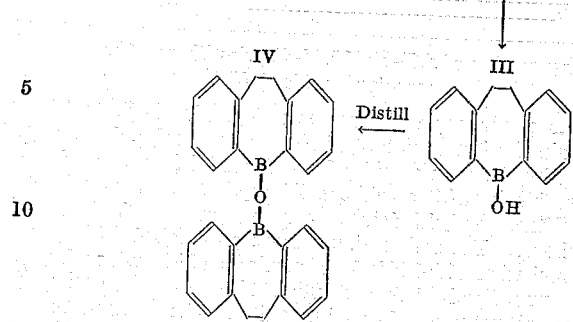

The compound of main interest here is II above which is called 5 - (2 - aminoethoxy) - 10,11-dihydrodibenzo[b,f]-borepine which melts at 195–196° C. after recrystallization from ethanol and water. However, compound III called 5-hydroxy-10,11-dihydrobenzo[b,f]-borepine is an unstable intermediate which dehydrates readily to compound IV which is a stable solid with an M. P. of 145–146° C.

The procedure used to carry out this series of reactions was as follows:

*Preparation of 1,2-bis-(o-bromophenyl)ethane (I)*

In a suitable 3-necked flask equipped with a stirrer, condenser and dropping funnel was placed 547 g. (3.35 mols) of o-bromotoluene which was illuminated by a mercury arc lamp. Over a three hour period, 172 ml. (3.35 mols) of bromine was added dropwise, while the mixture was stirred. Distillation of the reaction mixture yielded 492 g. (59% of theory) of o-bromobenzyl bromide with a B. P. of 127–133° C. at 15 mm. To 492 g. (1.97 mols) of this compound dissolved in 500 ml. of ether was added slowly 890 ml. of a 1.06 N ether solution of phenyllithium. During the addition, the ether refluxed spontaneously. The pale yellow solution formed was hydrolyzed with 300 ml. of water, the resulting layers were separated and the ether layer was washed, dried and distilled. The 1,2-bis-(o-bromophenyl)ethane distilled at 193–200° C. at 5 mm. and solidified on cooling. After recrystallization from 125 ml. of ethanol, it melted at 83° C. and weighed 191 g. (60% of theory).

*Preparation of 5-(2-aminoethoxy)-10,11-dihydrodibenzo [b,f]-borepine (II)*

A solution of 100 g. (0.294 mol) of compound I previously prepared in 600 ml. of ether was slowly added to 0.632 mol of butyllithium in 578 ml. of ether at 5° C. This mixture was refluxed for one hour, then transferred to a dropping funnel and slowly added to 67.5 g. (0.294 mol) of tributoxyborane in 700 ml. of ether at a temperature of −70° C. The resulting mixture was hydrolyzed with 400 ml. of 2 N hydrochloric acid. The ether layer was distilled with 700 ml. of toluene and 10 ml. of butanol. A liquid was obtained which boiled at 131–200° C. at 2 mm. This liquid was then distilled with excess ethanolamine and toluene. After the unreacted ethanolamine had been removed but before all of the toluene was distilled, the solution was cooled. A total of 30.8 g. (42% of theory) of aminoethoxydihydrodibenzoborepine was obtained as a white solid. When recrystallized from ethanol and water, it melted at 195–196° C. Elemental analysis and equivalent weight for this compound was as follows:

$C_{16}H_{18}ONB$

|   | Calculated | Found |
|---|---|---|
| B | 4.31 | 4.32 |
| N | 5.58 | 5.72 |
| Eq. Wt. | 251 | 245 |

*Preparation of 5,5¹-bis(10,11-dihydrodibenzo-[b,f]-borepinyl)oxide (IV)*

A .5 g. of sample of compound II previously prepared was dissolved in a mixture of 10 cc. of ethanol and 10 cc. of 6 N hydrochloric acid. On addition of 30 cc. of 1 N hydrochloric acid, a white solid separated. This solid was filtered and dried in a vacuum oven at 40° C. for two hours. The solid residue recovered weighed 0.381 g. and melted at 145–146° C. A portion (0.2337 g.) of this solid was dissolved in a solution of 15 cc. of ethanol, 15 cc. of water, and 2 g. of mannitol. The solution obtained was then titrated with standard sodium hydroxide using a Beckmann pH meter. The equivalent weight for the solid was found to be 199 compared to the calculated value of 199 for the borepinyl oxide, $C_{28}H_{24}OB_2$.

In another experiment, 6.11 g. of compound II was dissolved in a sodium hydroxide solution and acidified. The material was then extracted with ether and distilled with 200 cc. of toluene. Distillation of the residue left after removal of the toluene produced 3.84 g. (79% yield) of the oxide which boiled at 265–270° C. at 2 mm. Apparently, some decomposition occurred for this material melted over a range from 131–136° C. However, the neutralization equivalent found by titration (203) agreed closely with the calculated value for the oxide (199). The infra red spectra for the materials obtained by this process and by that described in the preceding paragraph were virtually identical.

It has been found that compounds of the type described are useful for depositing boric oxide on the walls of an engine to prevent corrosion. Such compounds are also soluble in gasoline and other hydrocarbons and may be used to prevent an increase in the minimum octane requirements of internal combustion engines. These compounds are equally useful as intermediate for the synthesis of other complex organoboron compounds.

Having thus described these unique boron compounds and methods for preparing them, it should be understood that other methods of preparation will be apparent to those skilled in the art and that within the scope of the appended claims this invention may be practiced otherwise than as specifically described.

What is desired to be claimed and secured by United States Letters Patent is:

1. A method of preparing stable heterocyclic boron compounds which comprises contacting o,o'-dilithio(1,2-diphenyl)-ethane with a trio-lower alkoxyborane, hydrolyzing the resulting reaction product with an aqueous solution of hydrochloric acid, heating the hydrolysis product with ethanolamine and recovering the 5-(2-aminoethoxy)-10,11-dihydrodibenzo-[b,f]-borepine that forms.

2. A method according to claim 1 in which the borepin reaction product is hydrolyzed and dried to produce 5,5¹-bis(10,11-dihydrodibenzo-[b,f]-borepinyl)oxide as a reaction product.

3. A method of preparing 5,5'-bis(10,11-dihydrodibenzo-[b,f]-borepinyl) oxide which comprises (1) refluxing an ether solution of 1,2-bis-(o-bromophenyl) ethane and butyl lithium to form o,o'-dilithio(1,2-diphenyl)ethane, (2) contacting said dilithio ethane with tributoxyborane in ether at about −70° C., (3) hydrolyzing the resulting mixture in an aqueous solution of hydrochloric acid to produce two liquid layers one of which is an ether layer, (4) separating the ether from said ether layer to leave a liquid residue, (5) heating ethanolamine with said liquid residue to produce 5-(2-aminoethoxy) - 10,11-dihydrodibenzo-[b,f]-borepine, (6) hydrolyzing said 5 - (2 - aminoethoxy) - 10,11-dihydrodibenzo-[b,f]-borepine to produce a solid hydrolysis product, (7) and then drying said product and recovering the resulting 5,5'-bis(10,11-dihydrodibenzo-[b,f]-borepinyl) oxide.

4. A compound having the formula

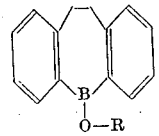

where R is a member of the group consisting of

—CH₂CH₂NH₂ and

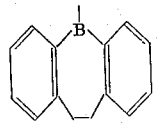

5. The compound 5-(2-aminoethoxy)-10,11-dihydrodibenzo-[b,f]-borepine having the structural formula

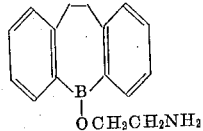

which melts at 195° C.

6. The compound 5,5¹-bis(10,11-dihydrodizenzo-[b,f]-borepinyl) oxide having the structural formula

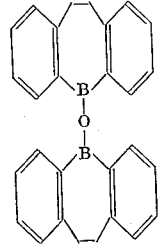

and which melts at 145–146° C., and is soluble in alcohol, benzene, ether, and hexane.

No references cited.

UNITED STATES PATENT OFFICE
CERTIFICATE OF CORRECTION

Patent No. 2,839,566 June 17, 1958

Robert L. Letsinger et al.

It is hereby certified that error appears in the printed specification of the above numbered patent requiring correction and that the said Letters Patent should read as corrected below.

Column 1, line 23, for "interest" read -- interesting --; column 2, line 22, for "with an" read -- with a --; column 3, line 13, before "sample" strike out "of"; line 58, for "trio-lower" read -- tri-lower --; line 63, for "borepin" read -- borepine --; column 4, line 47, for "dihydrodizenzo" read -- dihydrodibenzo --.

Signed and sealed this 12th day of August 1958.

(SEAL)
Attest:

KARL H. AXLINE
Attesting Officer

ROBERT C. WATSON
Commissioner of Patents